Dec. 19, 1933.                F. L. HAUSHALTER                1,939,848
                             RESILIENT MOTOR SUPPORT
                              Filed May 31, 1930
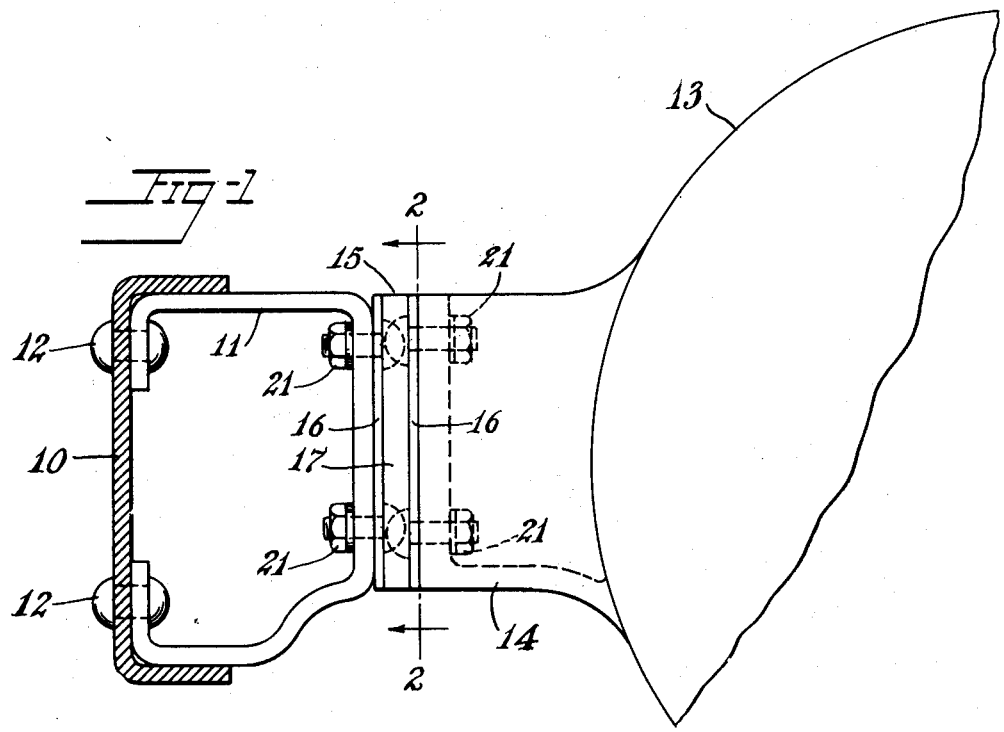
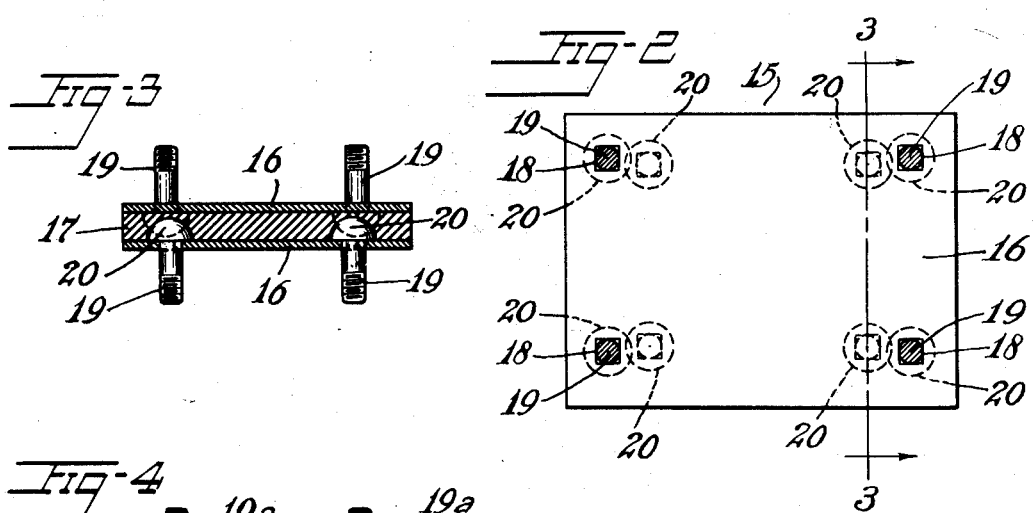
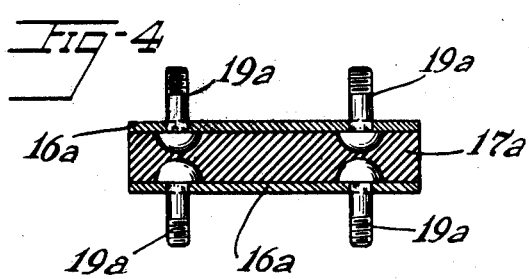

Patented Dec. 19, 1933

1,939,848

UNITED STATES PATENT OFFICE 1,939,848

RESILIENT MOTOR SUPPORT

Fred L. Haushalter, Akron, Ohio, assignor to The B. F. Goodrich Company, New York, N. Y., a corporation of New York Application May 31, 1930. Serial No. 458,001

6 Claims. (Cl. 248—14.2)

This invention relates to resilient motor supports such as are commonly used between the motor and frame of an automobile to insulate the frame from the motor and thereby substantially to localize the vibration of the latter.

The chief objects of the invention are to provide for ease of installation and simplicity of construction in a resilient motor support; and to provide a resilient motor support having relatively slight resilience in one direction as compared with its resilience in other directions. A more specific object is to provide a resilient motor support including attaching means embodied in a unitary structure.

Of the accompanying drawing:

Fig. 1 is a side elevation of my improved resilient motor support, in its preferred form, in operative association with the motor and frame of an automobile.

Fig. 2 is a section on line 2—2 of Fig. 1.

Fig. 3 is a section on line 3—3 of Fig. 2.

Fig. 4 is a transverse section through the motor support showing an alternative arrangement of the attaching means.

Referring to Fig. 1 of the drawing, 10 is one of the side frames of an automobile, 11 is a bracket secured thereto by rivets 12, 12 or the like, 13 is a portion of the motor casting, 14 is an arm projecting laterally therefrom, and 15 is a resilient motor support mounted between the bracket 11 and the arm 14.

The resilient support 15 comprises metal plates 16, 16 secured to the opposite sides of an intermediate layer or cushion of resilient rubber 17. Each of the plates 16 is formed, adjacent its corners, with square apertures 18, 18, and mounted therein are the square shoulders of respective bolts 19, 19, the heads 20, 20 of which are embedded in the rubber cushion 17, between the plates 16, and the threaded portions of which project laterally from the structure. The plates 16, bolt heads 20 and rubber cushion 17 are united by vulcanization of the said rubber cushion. The bracket 11 and arm 14 of the motor casting 13 are formed with bolt holes to receive the bolts 19 of the resilient support 15, and the latter is secured in place by nuts 21, 21 threaded onto said bolts.

In the embodiment of the invention shown in Figs. 1, 2, and 3, the bolts 19 which project from one side of the structure are offset with relation to those which extend from the opposite side thereof. The layer of rubber 20 is of such thickness that it provides a relatively thin cushion between each bolt head 20 and the opposite metal plate 16.

When the support 15 is mounted between an automobile frame and motor, it supports the motor and permits it freely to vibrate in a vertical direction and in an axial or horizontal direction, and the frame is substantially insulated from such vibrations, since they are absorbed by the resilient rubber layer 17. Unrestrained vibration of the motor in a lateral direction is not desired, and such vibration is resisted by the automobile frame, since the relatively thin layer of rubber between the bolt heads 20 and side plates 16 of the structure 15 has but little cushioning capacity against forces tending to compress it.

The improved motor support is compact and self contained, and the arrangement of squareshouldered bolts fitting within complementally shaped apertures in the side plates of the structure permits the nuts 21 to be drawn up tight without straining the adhesion of the rubber layer 17 to the bolt heads 20.

The alternative structure shown in Fig. 4 is provided for situations which require thicker rubber cushions than that shown in the other figures. The bolts $19^a$, $19^a$, which extend through the side plates $16^a$, $16^a$ on opposite sides of the structure, are aligned with each other transversely of the structure, and the rubber cushion $17^a$ is of sufficient thickness to provide a relatively thin layer of rubber between the heads of the bolts which extend from one side of the structure and the heads of the bolts which extend from the opposite side thereof. The structure functions in the same manner as the structure 15 previously described, movement of the side plates $16^a$ toward each other being limited by the close proximity of the opposite bolt-heads to each other.

The invention is susceptible of modification within the scope of the appended claims, as I do not limit my claims wholly to the specific construction shown.

I claim:

1. A resilient connector comprising a pair of metal plates formed with apertures, respective bolts mounted in said apertures and projecting from said plates, the bolt-heads being positioned between the plates, and a cushion of rubber between and coextensive with said plates and bonded to them, said cushion being relatively thin at said bolt heads.

2. A resilient connector comprising a pair of apertured metal plates, a cushion of rubber between said plates and bonded to them, and attaching bolts projecting through the apertures in said plates, the heads of the bolts being disposed between the plates and bonded to the rubber cushion in such positions as to limit the relative movement of the plates toward each other while permitting relatively free movement of the plates to exert tension on the rubber.

3. A support of the class described comprising a pair of spaced-apart apertured plates having an intervening cushion of rubber bonded to the plates and adapted to support the load principally under tension, and attaching bolts projecting through the apertures in the plates and having their heads so disposed between the plates as to limit the movement of the plates toward each other, the bolt heads being bonded to the rubber cushion.

4. A support of the class described comprising a pair of spaced-apart apertured plates having an intervening cushion of rubber bonded to the plates and adapted to support the load principally under tension, and attaching means for the support comprising a plurality of headed members passing through the plate apertures, at least one of said members having its head bonded to the rubber and so disposed between the plates as to limit the movement of the plates toward each other.

5. A resilient connector comprising a pair of metal plates, a cushion of rubber held between said plates and adapted to resist relative movement of said plates by tension of the rubber and attaching means for the structure comprising a projection at the inner surface of one of said plates in association with the rubber of said cushion for resiliently limiting relative movement of the plates in a direction to compress the rubber while permitting relatively free movement of the plates in directions to exert tension thereon.

6. A resilient connector comprising a pair of metal plates, a cushion of rubber held between said plates in tension-resisting relation thereto, and attaching means for the structure having an element positioned at the inner surface of one of the plates in such association with the rubber between the plates that relative movement of the plates toward each other is resiliently limited and relatively free movement of the plates relative to each other in other directions is permitted.

FRED L. HAUSHALTER.